US012690525B2

(12) United States Patent
Rongvaux et al.

(10) Patent No.: US 12,690,525 B2
(45) Date of Patent: Jul. 28, 2026

(54) BINDING DEVICE FOR A SQUARE BALER

(71) Applicant: Usines CLAAS France S.A.S, St. Rémy (FR)

(72) Inventors: Laurent Rongvaux, Tronville (FR); Jean Constant Albrecht, Saint-Nicolas-de-Port (FR); Marc Altmayer, Alzing (FR); Cyrille Arnould, Montoy Flonville (FR)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 0 days.

(21) Appl. No.: 19/028,611

(22) Filed: Jan. 17, 2025

(65) Prior Publication Data

US 2025/0228164 A1 Jul. 17, 2025

(30) Foreign Application Priority Data

Jan. 17, 2024 (DE) .......................... 102024101261.7

(51) Int. Cl.
  *A01F 15/08* (2006.01)
  *A01F 15/14* (2006.01)
(52) U.S. Cl.
  CPC ........ *A01F 15/0858* (2013.01); *A01F 15/145* (2013.01)
(58) Field of Classification Search
  CPC .. A01F 15/0858; A01F 15/145; A01F 15/146; B65B 13/24; B65B 13/26; B65B 13/28
  USPC ....................................................... 100/33 R
  See application file for complete search history.

(56) References Cited

U.S. PATENT DOCUMENTS

| | | | | |
|---|---|---|---|---|
| 3,448,681 A | * | 6/1969 | Nolt | A01F 15/0858 100/22 |
| 6,644,181 B2 | * | 11/2003 | Honhold | A01F 15/0858 56/343 |
| 9,814,185 B2 | | 11/2017 | Arnould et al. | |
| 11,690,322 B1 | | 7/2023 | Chaney | |
| 2013/0206019 A1 | | 8/2013 | Scharf | |
| 2018/0077872 A1 | | 3/2018 | Maelfeyt et al. | |
| 2023/0077734 A1 | | 3/2023 | Scharf et al. | |
| 2023/0084503 A1 | | 3/2023 | Scharf et al. | |
| 2024/0196802 A1 | | 6/2024 | Fuchs | |

(Continued)

FOREIGN PATENT DOCUMENTS

| | | |
|---|---|---|
| DE | 19627397 A1 | 10/1997 |
| EP | 3298884 B1 | 11/2019 |
| EP | 4248731 A1 | 9/2023 |

*Primary Examiner* — Christopher L Templeton
*Assistant Examiner* — Teresa A Guthrie
(74) *Attorney, Agent, or Firm* — Lempia Summerfield Katz LLC

(57) ABSTRACT

A binding device for a square baler for knotting a strip-shaped binder which is provided for binding a pressed bale. The binding device comprises at least one knotting device driven by a knotter shaft, a needle rocker pivotable about a pivot axis extending parallel to the knotter shaft on which binding needles are positioned, and a drive unit that has a shiftable gearbox which is driven by a drive shaft and is configured to drive the at least one knotting device and the needle rocker when a binding operation is triggered. The shiftable gearbox comprises a gearbox housing in which components of the gearbox and a triggering device for triggering the binding operation are positioned.

20 Claims, 6 Drawing Sheets

(56)  References Cited

U.S. PATENT DOCUMENTS

| | | |
|---|---|---|
| 2024/0196803 A1 | 6/2024 | Fuchs |
| 2024/0306552 A1 | 9/2024 | Fuchs |

* cited by examiner

BINDING DEVICE FOR A SQUARE BALER

CROSS REFERENCE TO RELATED APPLICATION

This application claims priority under 35 U.S.C. § 119 to German Patent Application No. DE 10 2024 101 261.7 filed Jan. 17, 2024, the entire disclosure of which is hereby incorporated by reference herein.

TECHNICAL FIELD

The present invention relates to a binding device for a square baler and to a square baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Harvested material bales may be pressed in square balers and bound with a binder after completion so that the bales do not fall apart. Strip-shaped binders, such as tapes or twine, are used for this purpose. Such binders are provided in the binding device, which has an upper twine guide (which includes a knotter) and a lower twine guide. After completion of the bale, the lower twine guide is fed to the upper twine guide, and a lower twine thread is knotted with an upper twine thread. The bale length is usually used as a measure for the completion of the harvested material bale. Further, a trigger to the binding process of the harvested material bale may be in a time-controlled manner.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
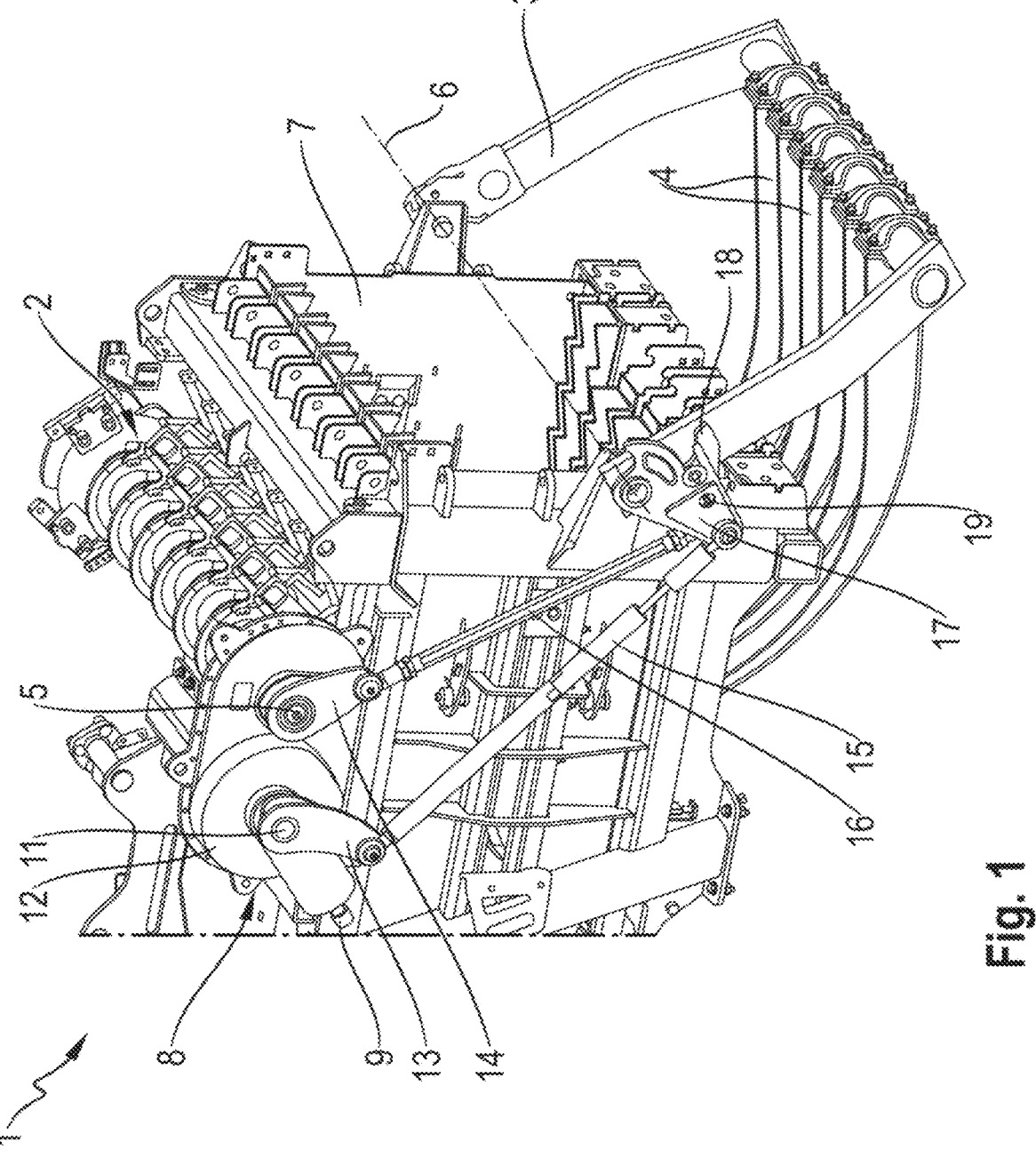
FIG. 1 illustrates a schematic and exemplary partial view of a square baler.

As discussed in the background, bales may be pressed in square balers and bound with a binder. In one or some embodiments, a binding device is disclosed and configured to knot a strip-shaped binder for a square baler with a drive unit configured to drive the binding device. In one or some embodiments, the binding device configured to knot a strip-shaped binder comprises a knotting device driven by a knotter shaft and a needle rocker pivotable about a pivot axis extending parallel to the knotter shaft and on which binding needles are arranged or positioned. The drive unit may include a shiftable gearbox driven by a drive shaft, which may be configured to drive the at least one knotting device and the needle rocker with the binding needles arranged or positioned thereon when a binding process is triggered.

In one or some embodiments, the binding device may have a drive unit with a gearbox for driving the binding device and a separate coupling for triggering a binding process, which may be arranged or positioned on a knotter drive shaft. In one or some embodiments, to trigger the binding process, an annular coupling shell may be arranged or positioned on the outside of the gearbox housing, with a knotter shaft coupling that may be arranged or positioned in the coupling shell. By engaging the knotter shaft coupling, the knotter drive shaft may be connected to a drive shaft oriented orthogonally to the knotter drive shaft.

In one or some embodiments, a square baler may be used under adverse operating and environmental conditions. In particular, the dust load when baling dry harvested material may lead to a significant contamination load. Due to the design of the drive unit and the resulting external arrangement of the knotter shaft coupling on the gearbox housing, the knotter shaft coupling may be exposed to almost unprotected contamination that may occur during operation of the square baler, which may significantly affect the service life of the binding device.

In this regard, in one or some embodiments, a binding device and a square baler are disclosed which may ensure a more reliable and durable operation of the binding device under the adverse operating and environmental conditions during operation of the square baler.

In one or some embodiments, a binding device for a square baler for knotting a strip-shaped binder is disclosed and configured to bind a pressed bale. The binding device may comprise at least one knotting device driven by a knotter shaft, a needle rocker pivotable about a pivot axis extending parallel to the knotter shaft, on which binding needles are arranged or positioned, and a drive unit. The drive unit may have a shiftable gearbox that is driven by a drive shaft and may be configured to drive the at least one knotting device and the needle rocker when a binding operation is triggered. In one or some embodiments, the shiftable gearbox comprises a gearbox housing in which one or more components of the shiftable gearbox and a triggering device configured to trigger the binding process are arranged or positioned.

Integrating the components of the gearbox and the triggering device for triggering the binding process into the gearbox housing may allow both the one or more components required for driving and for triggering the binding device are arranged or positioned on the square baler protected from external influences (e.g., dirt and the like). Thus, the components used for triggering and performing the binding process may be enclosed by the common gearbox housing, which may ensure reliable protection of these components from contamination occurring during operation of the square baler.

Various components of the shiftable gearbox are contemplated to be contained within the common gearbox housing. As one example, a bevel gear stage and/or a spur gear stage that may be driven by the bevel gear stage via an output shaft may form components of the gearbox that are arranged or positioned in the gearbox housing and may be completely enclosed thereby. In one or some embodiments, completely enclosed by the gearbox housing may mean that the drive shaft and the knotter shaft partially protrude from the gearbox housing so that they may be connected to drive components or components to be driven outside the gearbox housing.

In one or some embodiments, the bevel gear stage may have: a bevel pinion arranged or positioned on the drive shaft or connectable to the drive shaft; and a bevel gear arranged or positioned on the output shaft. The spur gear stage may have a gear wheel rotatably mounted on the output shaft, which may mesh with a mating gear arranged or positioned rotationally fixedly on the knotter shaft.

In one or some embodiments, any two or all of the bevel gear, the gearwheel and the triggering device may be arranged or positioned one behind the other viewed in the axial direction of the output shaft. The arrangement of the bevel gear, gearwheel and triggering device one behind the other may result in a low installation space requirement (e.g., less space for installation within the gearbox housing). This may simplify the integration of the gearbox components into the gearbox housing.

Furthermore, the gear wheel may be arranged or positioned eccentrically (e.g., symmetrically with respect to a respective center) on the output shaft and the mating gear eccentrically on the knotter shaft. The eccentric arrangement of the gear wheel and mating gear may mean that the movement sequence of the needle rocker and the binding needles arranged or positioned thereon may be synchronized with the stroke movement of the ram. Triggering and performing the binding process may require, on the one hand, rapid swiveling of the binding needles in and out and, on the other hand, a sufficient dwell time of the swiveled-in binding needles for interaction with the at least one knotting device. The eccentric arrangement of the gear wheel and mating gear may make it possible to control movements and ensure that the binding needles are always pulled out of the pressing channel at the right time (e.g., at a predetermined time such as prior to a ram in the pressing channel being used to press or compact harvested material in the pressing channel). In this regard, this may serve to avoid the ram, configured to press the new harvested material, moving in a compacting motion to press the new harvested material and potentially hitting the binding needles, thereby damaging them in the process.

In particular, a crank arm may be non-rotatably arranged or positioned on the knotter shaft to which a drive rod is articulated (e.g., constructed with one or more pivoted joints which allow bending of an otherwise rigid structure) at one end, the other end of which may be articulated to the needle rocker.

In one or some embodiments, the triggering device may comprise a claw coupling which is arranged or positioned on the side of the output shaft facing away from the bevel gear. The design of the triggering device as a claw coupling may represent a simple design of a coupling and may enable the transmission of high torque with a small installation space volume.

In one or some embodiments, the claw coupling has at least two coupling parts (e.g., a first coupling part and a second coupling part), wherein the first coupling part is arranged or positioned rotationally fixed and axially displaceable on the output shaft, and the second coupling part on which the gear wheel of the spur gear stage is arranged or positioned rotationally fixed is mounted freely rotatable on the output shaft. The axially displaceable coupling part may allow the claw coupling to be engaged in order to trigger the binding process.

For this purpose, the claw coupling may be actuated by applying pressure or force in order to transfer or transition the claw coupling from a disengaged position to an engaged position. The transfer of the claw coupling as a triggering device into the engaged position may cause the binding process to be triggered or initiated. A relief of pressure or force correspondingly may cause the claw coupling to be transferred from the engaged position to the disengaged position.

In one or some embodiments, a cam lever may be arranged or positioned on the rear side of the bevel gear facing the gear wheel, and a cam roller may be arranged or positioned on the side of the mating gear facing away from the knotter device. The cam roller, arranged or positioned on the side of the mating gear facing away from the knotter device and arranged or positioned eccentrically on the knotter shaft, may be temporarily entrained by the cam lever in accordance with the direction of rotation of the bevel gear. The torque required for the last rotation of the knotter shaft may be transmitted by the cam lever to the cam roller attached to the eccentrically arranged or positioned mating gear if this torque cannot be provided by the swivel movement of the needle rocker alone when swiveling back.

In one or some embodiments, a crank arm may be non-rotatably arranged or positioned on the knotter shaft to which a telescopic drive rod is articulated at one end, the other end of which may be articulated to the needle rocker. The rotation of the crank arm arranged or positioned on the output shaft and the associated movement and change in length of the telescopic drive rod may ensure that the binding needles swivel in and out of the pressing chamber in line with the lifting movement of the ram to compact the harvested material into a new square bale.

In one or some embodiments, a square baler with a binding device for knotting a strip-shaped binder is disclosed. The binding device of the square baler may be configured to bind a pressed bale, with the binding device comprising at least one knotting device driven by a knotter shaft, a needle rocker pivotable about a pivot axis extending parallel to the knotter shaft, on which binding needles are arranged or positioned, and a drive unit. The drive unit may have a shiftable gearbox, which may be driven by a drive shaft and may be configured to drive the at least one knotting device and the needle rocker with the binding needles arranged or positioned thereon when a binding operation is triggered. The binding device of the square baler may be designed as discussed herein.

Referring to the figures, FIG. 1 shows a schematic and exemplary partial view of a square baler 1. The square baler 1 may be coupled to an agricultural work machine, such as a tractor (not shown in the figures), so that the square baler 1 and the agricultural work machine together may form a so-called agricultural train. Example balers are illustrated in US Patent Application Publication No. 2013/0206019 A1, US Patent Application Publication No. 2023/0077734 A1, US Patent Application Publication No. 2023/0084503 A1, US Patent Application Publication No. 20240196803 A1, US Patent Application Publication No. 20240196802 A1, US Patent Application Publication No. 2024/0306552 A1, and U.S. Pat. No. 9,814,185, each of which is incorporated by reference herein in their entirety.

Figure 6:
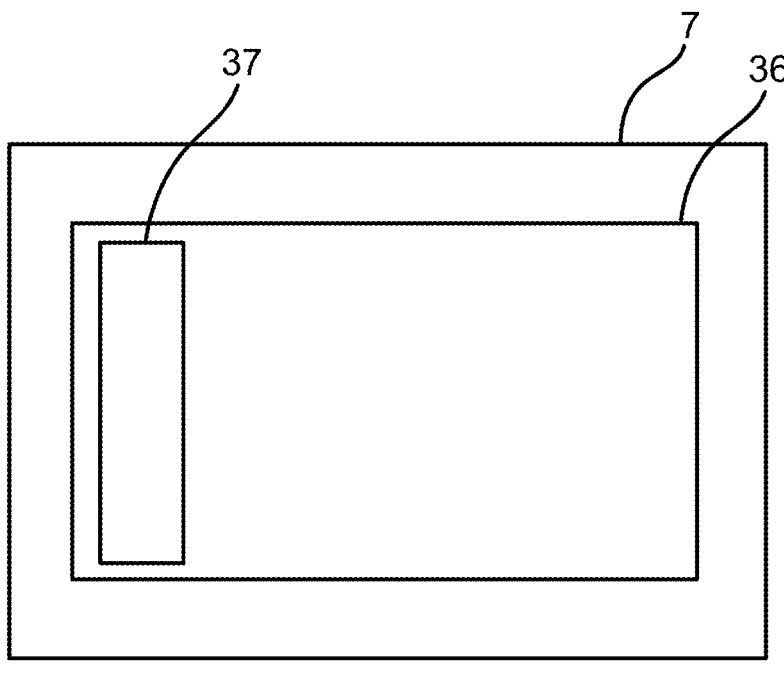
FIG. 6 illustrates a schematic and exemplary simplified view of the pressing channel and the ram of the square baler.

In one or some embodiments, the square baler comprises: a pick-up device, known as a pick-up, for picking up (or collecting) harvested material deposited in a swath on an agricultural area; a cutting rotor configured to shred the picked-up harvested material; a feed rake for pre-compressing the shredded harvested material and feeding it into a pressing channel 36 of the square baler 1; and a ram 37 movably arranged or positioned between end positions in the pressing channel 36 of the square baler 1 for pressing the pre-compressed harvested material into a square bale. See FIG. 6, which illustrates one example of the pressing channel 36 and the ram 37 of the square baler 1. In the pressing channel 36, the pre-compressed harvested material may be pressed into a predetermined shape, such as the square bale, with the ram 37, which may be moved back and forth cyclically in the pressing channel 36. Furthermore, the square baler 1 may comprise a binding device configured to knot a strip-shaped binder, which may be provided for binding a pressed bale.

In one or some embodiments, the square baler 1 has a drive train, not shown in detail, which may be supplied with drive power by an agricultural work machine, such as a tractor. For this purpose, at the rear, the agricultural production machine may have a power take-off, known to one of skill in the art.

In one or some embodiments, the binding device comprises any one, any combination, or all of: at least one knotting device 2 driven by a knotter shaft 5; binding needles 4 arranged or positioned on a needle rocker 3 and pivotable about a pivot axis 6 parallel to the knotter shaft 5; and a drive unit 8. The needle rocker 3 may be articulated to a housing 7 surrounding the pressing channel 36. The binding needles 4 arranged or positioned on the needle rocker 3 may act with the at least one knotting device 2 when binding the pressed bale.

In one or some embodiments, the drive unit 8 has a shiftable gearbox 10 driven by a drive shaft 9. The shiftable gearbox 10 may be configured to drive the at least one knotting device 2 and the binding needles 4 when a binding process is triggered. The drive shaft 9 may drive an output shaft 11 of the shiftable gearbox 10. In one or some embodiments, the shiftable gearbox 10 is enclosed by a gearbox housing 12.

In one or some embodiments, the drive train of the square baler 1 comprises the drive shaft 9, which, in turn, may comprise a torque input connection for the drive train 3, through which the drive train of the square baler 1 may be connected to the power take-off of the agricultural production machine.

In one or some embodiments, a crank arm 14 is arranged or positioned on the knotter shaft 5, and a crank arm 13 is arranged or positioned on the output shaft 11 so that it cannot rotate. A telescopic drive rod 15 (interchangeably termed telescopic actuator) may be articulated at one end to the crank arm 13 on the output shaft 11. The other end of the telescopic drive rod 15 may be articulated to the needle rocker 3. A drive rod 16 may be articulated at one end to the crank arm 14 on the knotter shaft 5 and may be articulated at its other end (e.g., opposite end) to the needle rocker 3.

In one or some embodiments, the telescopic drive rod 15 and the drive rod 16 may be articulated at a free end of a common lever arm about a common axis of rotation. The other end of the common lever arm may be pivotably articulated to the needle rocker 3 about the pivot axis 6.

FIG. 1 illustrates the telescopic drive rod 15 being pivotably articulated to a first lever arm 17 about an axis of rotation. The first lever arm 17 may be pivotably articulated to the needle rocker 3 about the pivot axis 6. The axis of rotation, about which the telescopic drive rod 15 may pivot, may be arranged or positioned radially spaced from the pivot axis 6 on the first lever arm 17. The rotary movement transmitted from the crank arm 13 to the telescopic drive rod 15 may result in a linear movement of the telescopic drive rod 15 in which it is extended and retracted with each rotation of the output shaft 11.

In one or some embodiments, the drive rod 16 is articulated to a second lever arm 18, which may be non-rotatably attached to the needle rocker 3. The first lever arm 17 may be connected to the second lever arm 18, such as by a shear bolt 19 or a shear screw. Through the shear bolt 19, forces acting from the telescopic drive rod 15 in its longitudinal direction may be transmitted to the second lever arm 18 and from this to the needle rocker 3.

Figure 2:
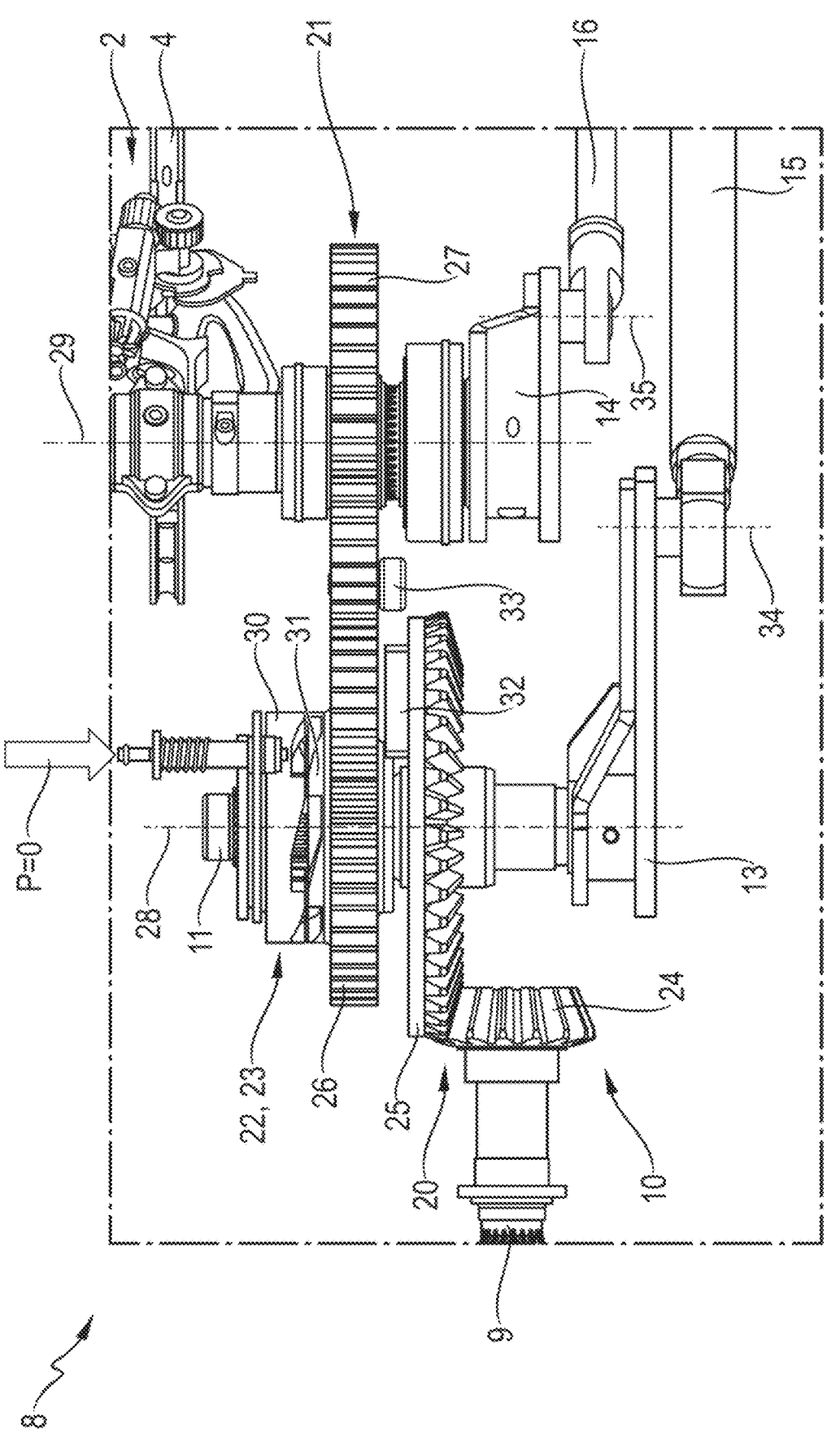
FIG. 2 illustrates a schematic and exemplary top view of a drive unit comprising a gearbox.

FIG. 2 shows a schematic and exemplary top view of a drive unit 8 comprising a shiftable gearbox 10. The representation illustrates components of the shiftable gearbox 10 which may be enclosed by the gearbox housing 12 for protection against external influences. In one or some embodiments, "completely enclosed by the gearbox housing 12" may mean that the drive shaft 9 and the knotter shaft 5 partially protrude from the gearbox housing 12 so that they may be connected to drive components or components to be driven outside the gearbox housing 12.

In one or some embodiments, a bevel gear stage 20 and a spur gear stage 21 drivable by the bevel gear stage 20 via the output shaft 11, and a triggering device 22 designed as a claw coupling 23 may form the components of the shiftable gearbox 10, any one, any combination, or all of which may be enclosed by the gearbox housing 12. Via the triggering device 22, the binding process may be triggered when the compressed bale reaches or exceeds a predetermined bale length.

In one or some embodiments, the transmission of a force from the telescopic drive rod 15 to the second lever arm 18 may depend on the engagement position of the triggering device 22.

In one or some embodiments, the bevel gear stage 20 has a bevel pinion 24 arranged or positioned on the drive shaft 9 or connectable thereto and a bevel gear 25 arranged or positioned on the output shaft 11.

Figure 5:
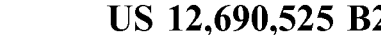
FIG. 5 illustrates a schematic and exemplary simplified partial view of the gearbox according to FIG. 4.

In one or some embodiments, the spur gear stage 21 has a gear wheel 26 rotatably mounted on the output shaft 11, which may mesh with a mating gear 27 arranged or positioned non-rotatably on the knotter shaft 5. The gear wheel 26 may be arranged or positioned eccentrically on the output shaft 11, and the mating gear 27 may be arranged or positioned eccentrically on the knotter shaft 5 as shown in FIG. 5.

An axis of rotation of the output shaft 11 is designated by the reference sign 28, and an axis of rotation of the knotter shaft 5 is designated by the reference sign 29.

In one or some embodiments, the claw coupling 23 has at least two coupling parts 30, 31 (such as exactly two coupling parts). One coupling part 30 may be arranged or positioned in a rotationally fixed and axially displaceable on the output shaft 11. The coupling part 31, which may be complementary to the axially displaceable coupling part 30, may be mounted freely rotatable on the output shaft 11. The gear wheel 26 of the spur gear stage 21 may be non-rotatably arranged or positioned on the freely rotatable coupling part 31. The claw coupling 23 may be in the disengaged position in the bale formation phase of the square baler 1 shown in FIG. 2.

In one or some embodiments, the two coupling parts 30, 31 have claws that are designed as wedge-shaped and may protrude from the respective end faces of the coupling parts 30, 31. In one or some embodiments, the wedge-shaped design may result from the fact that the claws protrude from the annular surface of the end faces. As a result, the claws may transmit torque in one direction, while no torque is transmitted in the other direction.

Figure 3:
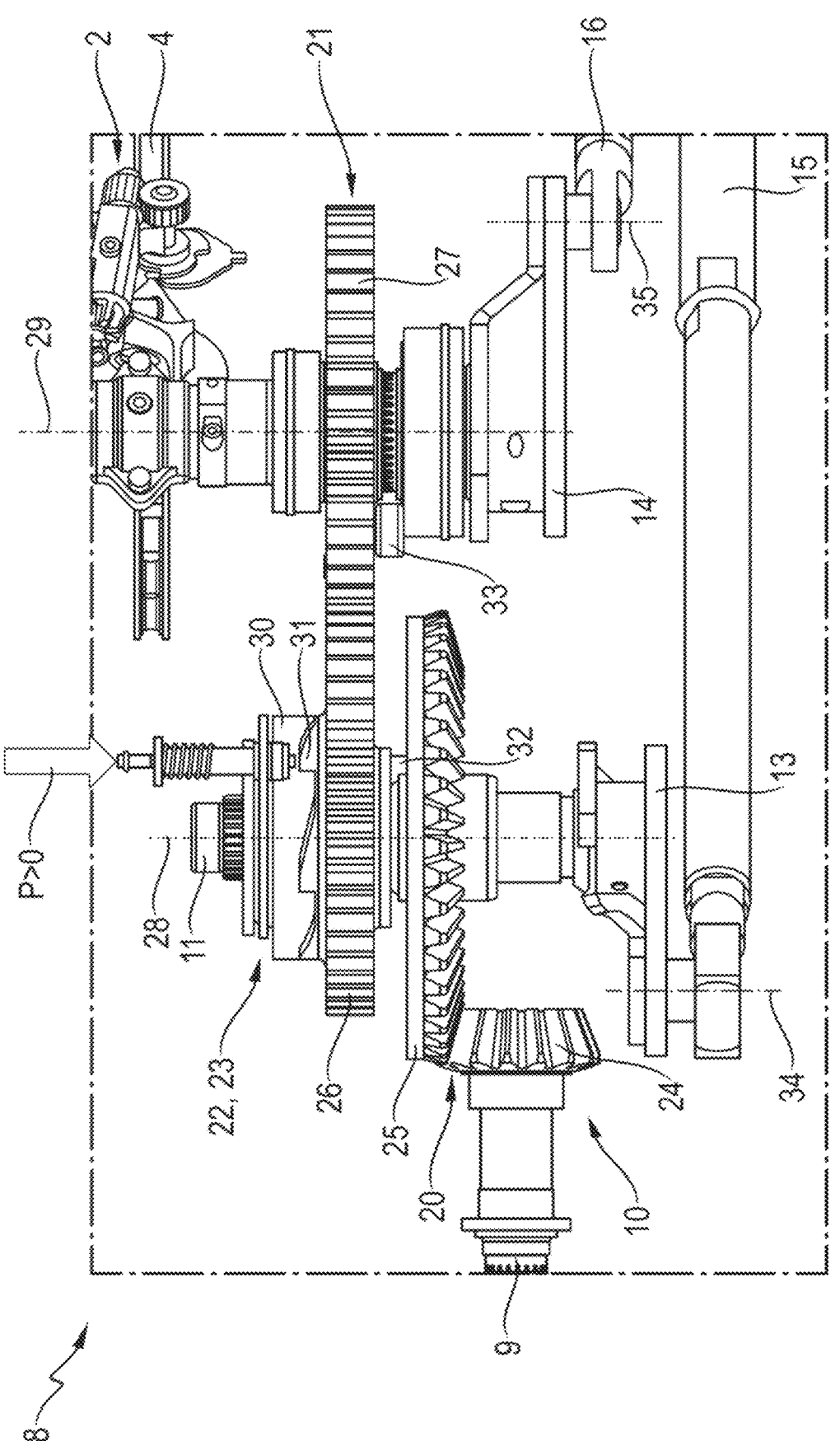
FIG. 3 illustrates a schematic and exemplary top view of the gearbox according to FIG. 2 with activated triggering device.

By applying a pneumatic or hydraulic pressure P or a force acting in the axial direction to the coupling part 30 arranged or positioned axially displaceable on the output shaft 11, the claw coupling 23 may be moved into a position in which the claws of the coupling parts 30, 31 engage in a form fit with one another as shown in FIG. 3.

In FIG. 2, the triggering device 22 or the claw coupling 23 is shown in its ready position without applied pressure (e.g., the pressure P is zero). The axially displaceable coupling part 30 may be rotated relative to the coupling part 31 to such an extent that the complementary claws are in contact with each other. In one or some embodiments, there is no torque transmission through the claw coupling 23 so that the at least one knotter device 5 has no drive. Due to the lack of applied pressure, the two coupling parts 30, 31 may remain in this ready position of the triggering device 22.

In the ready position of the triggering device 22, the crank arm 13 driven by the output shaft 11 may rotate permanently about the axis of rotation 28 while the crank arm 14 may be stationary due to the disengaged position of the coupling parts 30, 31.

In one or some embodiments, the output shaft 11 rotates relative to the gear wheel 26 rotatably mounted thereon using the coupling part 31. The rotation of the crank arm 13 and the associated movement and change in length of the telescopic drive rod 15 may ensure that the binding needles 4 are outside the baling channel during the baling phase. The needle rocker 3 may be in a rest position. For this purpose, the telescopic drive rod 15 may have an extension length so that the crank arm 13 may perform complete rotations around the axis of rotation 28 of the output shaft 9 during the bale binding phase while the needle rocker 3 remains in its rest position.

In one or some embodiments, a cam lever 32 is arranged or positioned on the rear side of the bevel gear 25 facing the gear wheel 26. A cam roller 33 is arranged or positioned on the side of the mating gear 27 facing away from the knotter device 2. The function and the interaction of the cam lever 32 and cam roller 33 of the spur gear stage 21 is explained in more detail below with reference to FIG. 5.

An axis of rotation on the crank arm 13, about which the telescopic drive rod 15 may rotate, is designated by the reference sign 34. An axis of rotation in the crank arm 14, about which the drive rod 16 may rotate, is designated by the reference sign 35.

FIG. 3 shows a schematic and exemplary top view of the gearbox according to FIG. 2 with activated triggering device 22. To activate the triggering device 22, the claw coupling 23 may be subjected to a pressure P greater than zero (e.g., a pressure this is at least a predetermined amount of pressure greater than zero). The claws of the two coupling parts 30, 31 may engage in a form fit with each other. For this purpose, the axially displaceable coupling part 30 may be axially engaged by the pressurization with the pressure P. By actuating the triggering device 22, a rotational movement and a torque may be transmitted through the spur gear stage 21 to the knotter shaft 5. The square baler 1 may be in the binding phase. In the binding phase, the at least one knotting device 2 and the binding needles 4 may work together to knot the strip-shaped binding material comprising (or consisting of) upper thread and lower thread.

Figure 4:
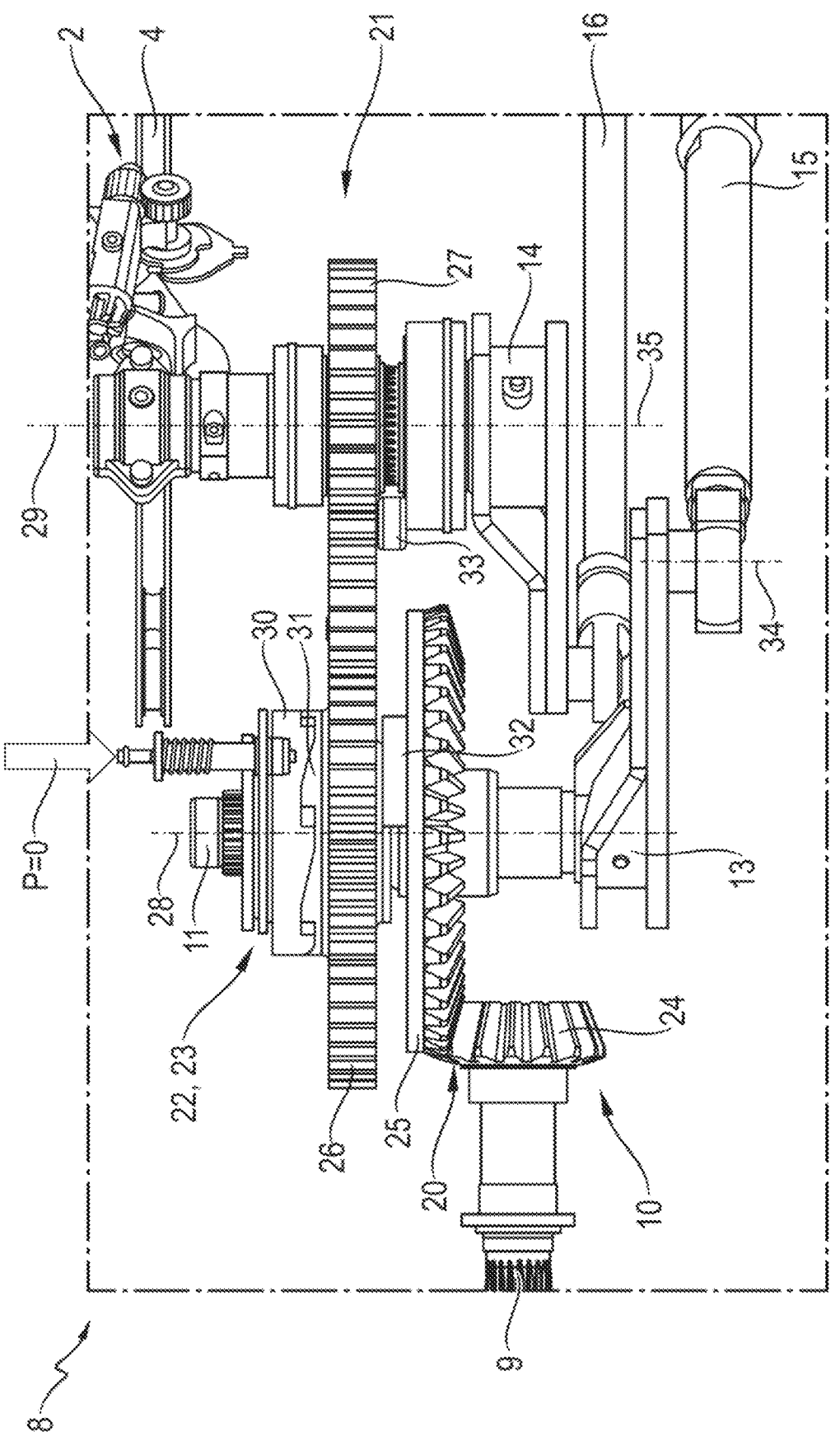
FIG. 4 illustrates a schematic and exemplary top view of the gearbox according to FIG. 3 at the end of a binding phase.

FIG. 4 shows a schematic and exemplary top view of the shiftable gearbox 10 according to FIG. 3 at the end of the binding phase. In one or some embodiments, the triggering device 22 may be deactivated by setting the pressure P or the force applied to the triggering device 22 back to zero.

The axially displaceable coupling part 30 and the complementary coupling part 31 may initially disengage from each other in the circumferential direction, wherein a gap may form between adjacent claws of the coupling parts 30, 31. In this position in which no torque is transmitted between the two coupling parts 30, 31, the claw coupling 23 may be released.

In this phase, the needle rocker 3, with the binding needles 4 arranged or positioned thereon, may be swung back by the telescopic drive rod 15 to release the pressing channel 36. The drive rod 16 may no longer be driven via the spur gear stage 21, but by the swivel movement of the needle rocker 3 about the swivel axis 6. The drive rod 16 may transmit the swivel movement of the needle rocker 3 to the at least one knotting device 2 in order to drive it.

FIG. 5 shows a schematic and exemplary simplified partial view of the shiftable gearbox 10 as shown in FIG. 4. To illustrate the gear wheel 26 behind it, the bevel gear 25 has been omitted from the illustration. The gear wheel 26 and the mating gear 27 of the spur gear stage 21 may be arranged or positioned eccentrically on the output shaft 11 or the knotter shaft 5.

In order to move the needle rocker 3 to its starting position outside the pressing channel 36, the rotational movement of the knotter shaft 5 may be supported by the cam lever 32, which may be arranged or positioned on the rear side of the bevel gear 25 facing the gear wheel 26 and eccentric to the axis of rotation 28. The cam roller 33, arranged or positioned on the side of the mating gear 27 facing away from the knotter device 2 and arranged or positioned eccentrically on the knotter shaft 5, may be temporarily entrained by the cam lever 32 in accordance with the direction of rotation of the bevel gear 25. Since a torque may be required for the last rotation of the knotter shaft 5, the cam lever 32 and the cam roller 33 attached to the mating gear 27 arranged or positioned eccentrically on the knotter shaft 5 may assume this function if this torque cannot be provided by the swivel movement of the needle rocker 3 alone when it swivels back. The cam lever 32 may transmit the torque transmitted by the bevel gear 25 to the cam roller 33.

In one or some embodiments, the structure of the shiftable gearbox 10 illustrated in FIGS. 2-5 may enable a compact and space-saving design so that the shiftable gearbox 10 with its one or more components (e.g., any one, any combination, or all of the bevel gear stage 20; the spur gear stage 21; or the triggering device 22 designed as a claw coupling 23) may be arranged or positioned in the common gearbox housing 12, which may completely enclose the one or more components as shown in FIG. 1.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

List of Reference Numbers

| | |
|---|---|
| 1 | Square baler |
| 2 | Knotter device |
| 3 | Needle rocker |
| 4 | Binding needle |
| 5 | Knotter shaft |
| 6 | Pivot axis |
| 7 | housing |
| 8 | Drive unit |
| 9 | Drive shaft |
| 10 | Gearbox |
| 11 | Output shaft |
| 12 | Gearbox housing |
| 13 | Crank arm |
| 14 | Crank arm |
| 15 | Drive rod |
| 16 | Drive rod |
| 17 | First lever arm |
| 18 | Second lever arm |
| 19 | Shear bolt |
| 20 | Bevel gear stage |
| 21 | Spur wheel stage |
| 22 | Trigger device |
| 23 | Claw coupling |
| 24 | Bevel pinion |
| 25 | Bevel gear |
| 26 | Gear wheel |
| 27 | Mating gear |
| 28 | Axis of rotation |
| 29 | Axis of rotation |
| 30 | Coupling part |
| 31 | Coupling part |
| 32 | Cam lever |
| 33 | Cam roller |
| 34 | Axis of rotation |
| 35 | Axis of rotation |
| 36 | Pressing channel |
| 37 | Ram |
| P | Pressure |

The invention claimed is:

1. A binding device for a square baler for knotting a strip-shaped binder that is provided for binding a pressed bale, the binding device comprising:

at least one knotting device driven by a knotter shaft;

a needle rocker pivotable about a pivot axis extending parallel to the knotter shaft on which binding needles are positioned; and a drive unit including a shiftable gearbox that is driven by a drive shaft and that is configured to drive the at least one knotting device and the needle rocker responsive to a triggering device triggering a binding operation being triggered, wherein the shiftable gearbox comprises a gearbox housing that houses one or more components of the shiftable gearbox and the triggering device configured to trigger the binding operation;

wherein an output shaft is configured to drive at least one of the one or more components of the shiftable gearbox housed within the gearbox housing or is configured to be driven by the drive shaft; and wherein the triggering device comprises a claw coupling positioned on the output shaft.

2. The binding device of claim 1, wherein the at least one of the one or more components of the shiftable gearbox housed within the gearbox housing comprise at least one of a bevel gear stage and a spur gear stage configured to be driven by the bevel gear stage via the output shaft.

3. The binding device of claim 2, wherein the one or more components of the shiftable gearbox housed within the gearbox housing comprise both the bevel gear stage and the spur gear stage.

4. The binding device of claim 3, wherein each of the bevel gear stage, the spur gear stage, and the triggering device are housed within the gearbox housing.

5. The binding device of claim 3, wherein the bevel gear stage has a bevel pinion positioned on the drive shaft or connectable thereto and a bevel gear positioned on the output shaft; and wherein the spur gear stage has a gear wheel rotatably mounted on the output shaft which meshes with a mating gear positioned rotationally fixed on the knotter shaft.

6. The binding device of claim 5, wherein the bevel gear, the gear wheel and the triggering device are positioned one behind the other as viewed in an axial direction of the output shaft.

7. The binding device of claim 6, wherein the gear wheel is positioned eccentrically on the output shaft; and wherein the mating gear is positioned eccentrically on the knotter shaft.

8. The binding device of claim 7, wherein the gear wheel positioned eccentrically on the output shaft and the mating gear positioned eccentrically on the knotter shaft results in a movement sequence of the needle rocker and the binding needles positioned thereon being synchronized with a stroke movement of a ram configured to press harvested material of the square baler.

9. The binding device of claim 7, wherein the gear wheel positioned eccentrically on the output shaft and the mating gear positioned eccentrically on the knotter shaft results in the binding needles being pulled out of a pressing channel of the square baler prior to a ram in the pressing channel being used to press harvested material in the pressing channel.

10. The binding device of claim 5, wherein a crank arm is non-rotatably positioned on the knotter shaft, to which a drive rod is articulated at one end, the other end of which is articulated to the needle rocker.

11. The binding device of claim 5, wherein the claw coupling is positioned on a side of the output shaft facing away from the bevel gear.

12. The binding device of claim 11, wherein the claw coupling has at least a first coupling part and a second coupling part;

wherein the first coupling part is positioned rotationally fixed and axially displaceable on the output shaft; and wherein the second coupling part, on which the gear wheel of the spur gear stage is positioned rotationally fixed, is mounted freely rotatable on the output shaft.

13. The binding device of claim 12, wherein the claw coupling is configured to transfer from a disengaged position to an engaged position responsive to applying pressure or force to at least a part of the claw coupling.

14. The binding device of claim 13, wherein responsive to the claw coupling transferring to the engaged position responsive to the applying the pressure or the force, the triggering device is configured to trigger the binding operation.

15. The binding device of claim 5, further comprising:

a cam lever positioned on a rear side of the bevel gear facing the gear wheel; and a cam roller positioned on a side of the mating gear facing away from the knotting device.

16. The binding device of claim 15, wherein the cam roller is further positioned eccentrically on the knotter shaft.

17. The binding device of claim 16, wherein the cam roller is entrained by the cam lever in accordance with a direction of rotation of the bevel gear.

18. The binding device of claim 3, further comprising a crank arm non-rotatably positioned on the output shaft, to which a telescopic drive rod is articulated at one end of the crank arm, and which is articulated at another end of the crank arm to the needle rocker.

19. The binding device of claim 18, wherein rotation of the crank arm and an associated movement and change in length of the telescopic drive rod are configured to ensure that the binding needles swivel in and out of a pressing chamber of the baler in line with a lifting movement of a ram in the pressing chamber to compact harvested material into a new square bale.

20. A square baler comprising:

a binding device configured to knot a strip-shaped binder for binding a pressed bale, the binding device comprising:

at least one knotting device driven by a knotter shaft;

a needle rocker pivotable about a pivot axis extending parallel to the knotter shaft on which binding needles are positioned; and a drive unit including a shiftable gearbox that is driven by a drive shaft and that is configured to drive the at least one knotting device and the needle rocker responsive to a triggering device triggering a binding operation being triggered, wherein the shiftable gearbox comprises a gearbox housing that houses one or more components of the shiftable gearbox and the triggering device configured to trigger the binding operation;

wherein an output shaft is configured to drive at least one of the one or more components of the shiftable gearbox housed within the gearbox housing or is configured to be driven by the drive shaft; and wherein the triggering device comprises a claw coupling positioned on the output shaft.

\* \* \* \* \*